United States Patent
Schneider et al.

(10) Patent No.: US 7,471,861 B2
(45) Date of Patent: Dec. 30, 2008

(54) OPTICAL TRANSMISSION ELEMENT

(75) Inventors: Reiner Schneider, Ebersdorf (DE); Edgar Heinz, Steinach (DE); Frank Koschwitz, Rödental (DE)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/980,948

(22) Filed: Oct. 31, 2007

(65) Prior Publication Data
US 2008/0080821 A1    Apr. 3, 2008

Related U.S. Application Data

(63) Continuation of application No. 10/475,275, filed on Oct. 20, 2003, now Pat. No. 7,349,607.

(51) Int. Cl.
*G02B 6/44* (2006.01)
(52) U.S. Cl. .................. 385/102; 100/109; 100/111
(58) Field of Classification Search ................ 385/100, 385/102, 105–114, 123–128
See application file for complete search history.

(56) References Cited

U.S. PATENT DOCUMENTS

| | | | |
|---|---|---|---|
| 4,226,504 A | 10/1980 | Bellino | 350/96.23 |
| 4,701,015 A | 10/1987 | Saito et al. | 350/96.23 |
| 4,705,571 A | 11/1987 | Lange et al. | 106/287 |
| 4,707,569 A | 11/1987 | Yoshimura et al. | 174/116 |
| 4,725,628 A | 2/1988 | Garvey et al. | 521/137 |
| 4,725,629 A | 2/1988 | Garvey et al. | 521/137 |
| 4,815,813 A | 3/1989 | Arroyo et al. | 350/96.23 |
| 4,818,060 A | 4/1989 | Arroyo | 350/96.23 |
| 4,909,592 A | 3/1990 | Arroyo et al. | 350/96.23 |
| 4,913,517 A | 4/1990 | Arroyo et al. | 350/96.23 |
| 5,016,952 A | 5/1991 | Arroyo et al. | 350/96.2 |
| 5,054,880 A | 10/1991 | Bruggendieck | 385/111 |
| 5,109,456 A | 4/1992 | Sano et al. | 385/100 |
| 5,133,034 A | 7/1992 | Arroyo et al. | 385/107 |
| 5,224,190 A | 6/1993 | Chu et al. | 385/107 |

(Continued)

FOREIGN PATENT DOCUMENTS

DE    2445532    1/1976

(Continued)

OTHER PUBLICATIONS

United States Patent Application Publication No. US2003/0068147A1, Apr. 2003.

(Continued)

*Primary Examiner*—Kevin S Wood
(74) *Attorney, Agent, or Firm*—C. Keith Montgomery

(57) ABSTRACT

Between an optical fiber (LF11, LFB12, LFB13) and a surrounding core covering (AH11, AH12, SB13) of an optical transmission element (OE11 to OE13) there is at least one dry and compressible fixating element (FE11 to FE13), which surrounds the optical fiber totally or partially, and which exerts a defined contact pressure against the core covering and against the optical fiber for fixating the optical fiber in the longitudinal direction of the transmission element. The fixating element is further formed and positioned in such a way, that position changes of the optical fiber due to bending or elongation are possible. In this way, unallowable attenuation increases in the optical fiber due to bending or position changes can be avoided.

24 Claims, 5 Drawing Sheets

U.S. PATENT DOCUMENTS

| | | | |
|---|---|---|---|
| 5,243,675 A | 9/1993 | Kathiresan et al. | 385/109 |
| 5,377,290 A | 12/1994 | Ohta et al. | 385/100 |
| 5,422,973 A | 6/1995 | Ferguson et al. | 385/112 |
| 5,509,097 A | 4/1996 | Tondi-Resta et al. | 385/113 |
| 5,621,841 A | 4/1997 | Field | 385/113 |
| 5,621,842 A | 4/1997 | Keller | 385/113 |
| 5,684,904 A | 11/1997 | Bringuier et al. | 385/109 |
| 5,689,601 A | 11/1997 | Hager et al. | 385/100 |
| 5,698,615 A | 12/1997 | Polle | 523/173 |
| 5,763,067 A | 6/1998 | Bruggemann et al. | 428/317.9 |
| 5,838,863 A | 11/1998 | Fujiura et al. | 385/103 |
| 6,087,000 A | 7/2000 | Girgis et al. | 428/392 |
| 6,091,871 A | 7/2000 | Elisson et al. | 385/113 |
| 6,122,424 A | 9/2000 | Bringuier | 385/100 |
| 6,178,278 B1 | 1/2001 | Keller et al. | 385/109 |
| 6,226,431 B1 | 5/2001 | Brown et al. | 385/114 |
| 6,229,944 B1 | 5/2001 | Yokokawa et al. | 385/114 |
| 6,278,826 B1 | 8/2001 | Sheu | 385/109 |
| 6,321,012 B1 * | 11/2001 | Shen | 385/106 |
| 6,377,738 B1 | 4/2002 | Anderson et al. | 385/113 |
| 6,389,204 B1 | 5/2002 | Hurley | 385/102 |
| 6,463,199 B1 | 10/2002 | Quinn et al. | 385/109 |
| 6,504,979 B1 | 1/2003 | Norris et al. | 385/109 |
| 6,574,400 B1 | 6/2003 | Lail | 385/109 |
| 6,586,094 B1 | 7/2003 | Rebouillat et al. | 428/372 |
| 6,711,329 B2 | 3/2004 | Zelesnik | 385/100 |

FOREIGN PATENT DOCUMENTS

| | | |
|---|---|---|
| DE | 2434280 | 2/1976 |
| DE | 2743260 A1 | 4/1979 |
| DE | 2944997 | 8/1980 |
| DE | 19713063 A1 | 10/1998 |
| DE | 10129772 A1 | 1/2003 |
| EP | 0022036 A1 | 7/1980 |
| EP | 0577233 A1 | 1/1994 |
| EP | 0916980 A1 | 5/1999 |
| EP | 1065545 A1 | 1/2001 |
| EP | 1170614 A1 | 1/2002 |
| EP | 1302796 A1 | 4/2003 |
| GB | 2159291 A | 11/1985 |
| GB | 3444500 A1 | 11/1985 |
| GB | 21899071 A | 10/1987 |
| JP | 61-023104 | 1/1986 |
| JP | 9-152535 | 6/1997 |
| JP | 11-271581 | 10/1999 |
| JP | 11-337783 | 12/1999 |
| JP | 2001-343565 | 12/2001 |
| JP | 2001-343566 | 12/2001 |
| JP | 2002-236241 | 8/2002 |
| WO | 02/099491 A1 | 12/2002 |

OTHER PUBLICATIONS

United States Patent Application Publication No. US2003/0044137A1 dated Mar. 6, 2003.

United States Patent Application Publication No. US2002/0009272A1, Jan. 24, 2002.

Norris, R. H.; Weinmann, P.A., "Dry Central Tube Ribbon Cables for the Outside Plant Environment", Proc. Of the 51st Intern. Wire & Cable Symposium, p. 202-210 (2002).

Van Vickle, P., et al., "Innovative Dry Buffer Tube Design for Central Tube Ribbon Cable", Proc. Of the 2001 National Fiber Optics Engineers Conference, p. 154-161 (2001).

Taylor, C., et al., "Effect of Water Blocking Materials On Moisture Diffusion in Prototype Cable Structures", Proc. of the 50th Intern. Wire & Cable Symposium, p. 518-525 (2001).

Dixon, L., et al., "Crush and Bending Resistance in Next Generation Cable Designs", Proc. Of the 50th Intern. Wire & Cable Symposium, p. 422-431 (2001).

Wagman, R., et al., "BOTDR Analysis of Cable Tensile Testing", Proc. Of the 48th Wire & Cable Symposium, p. 658-664 (1999).

Beasley, B., "Look, Mom! No Gel!" Outside Plant Magazine. Dec. 2002. p. 16-18.

Geca-Tapes, Non-Woven Wrapping-Tapes Catalog "Foam Tapes", Apr. 1996.

Geca-Tapes, Waterblocking Tapes Catalog—"Waterblocking Foam Tapes", Apr. 1996.

Dow Plastics, "Resin For Pipe Extrusion and Pipe Fittings", Apr. 7, 2003.

Chung, Su-Vun, "Macrobend Loss of 1300nm Optimized Single Mode Fibre" at 1550 nm, International Wire & Cable Symposium Proceedings 1988. pp. 704-709.

\* cited by examiner

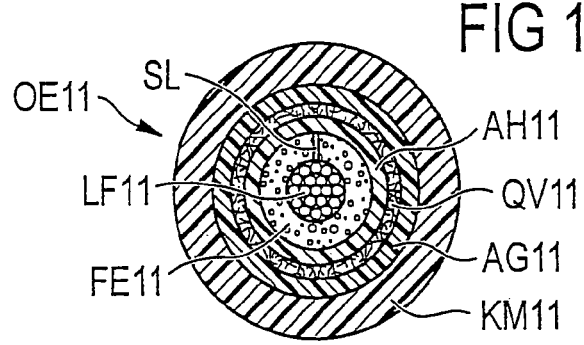
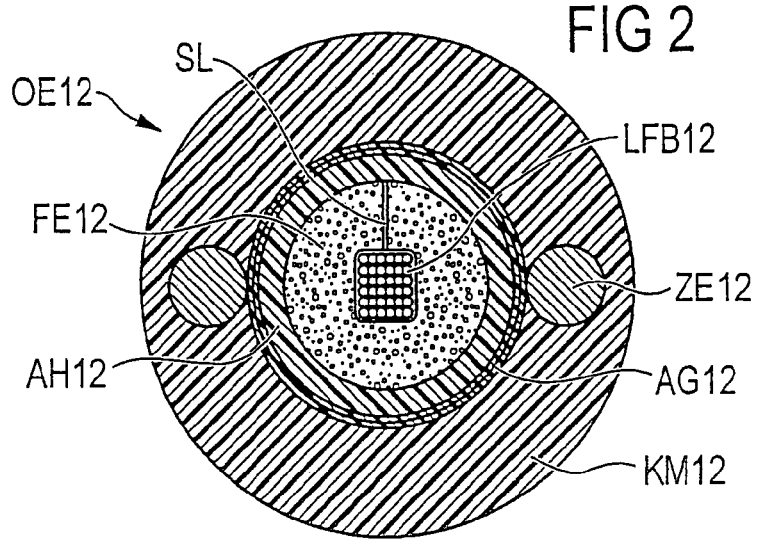
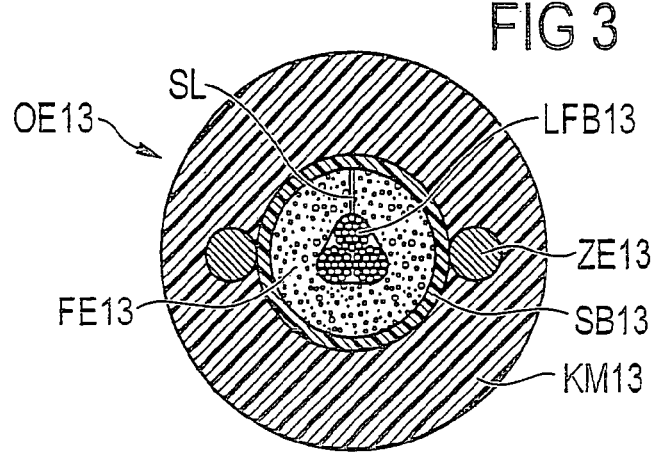

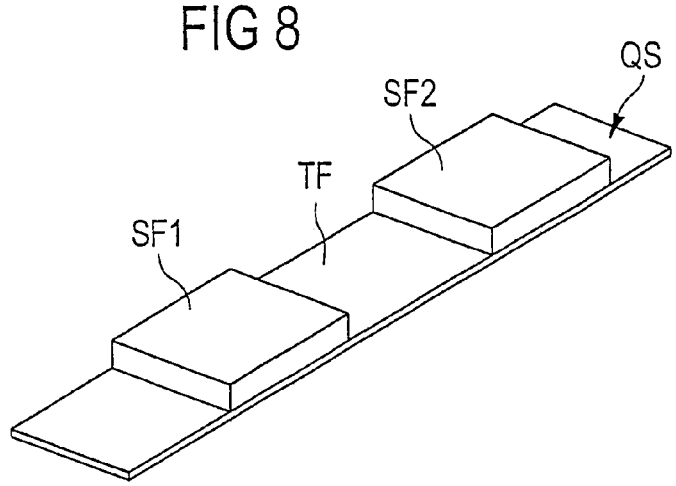
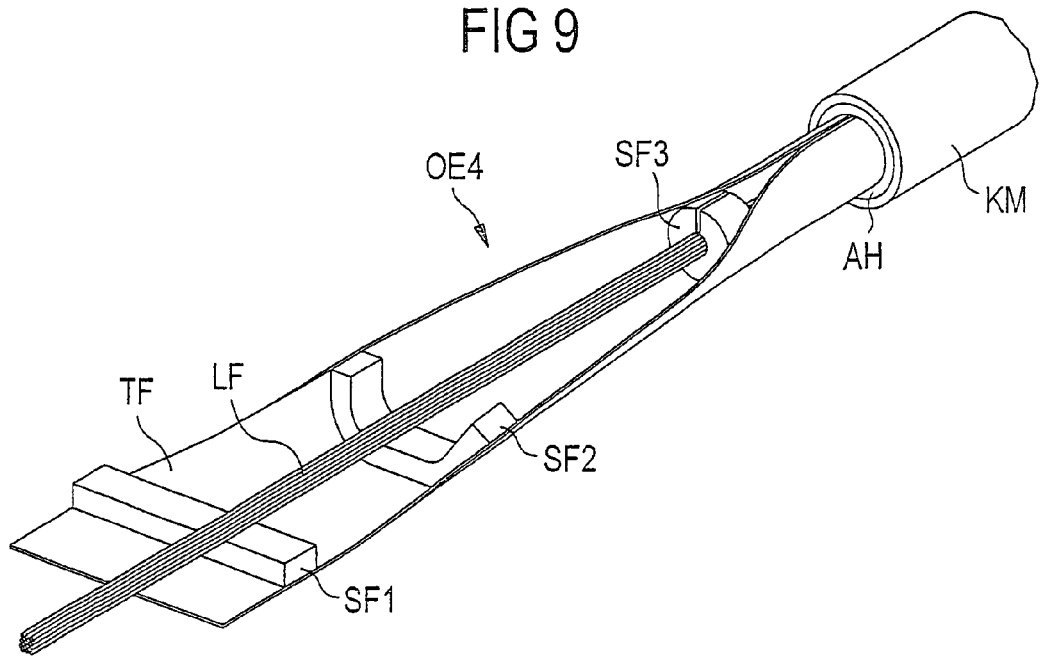

OPTICAL TRANSMISSION ELEMENT

RELATED APPLICATIONS

This application is a Continuation of U.S. application Ser. No. 10/475,275 filed on Oct. 20, 2003, which is now U.S. Pat. No. 7,349,607.

FIELD OF INVENTION

Between an optical fiber (LF11, LFB12, LFB13) and a surrounding core covering (AH11, AH12, SB13) of an optical transmission element (OE11 to OE13) there is at least one dry and compressible fixating element (FE11 to FE11), which surrounds the optical fiber totally or partially, and which exerts a defined contact pressure against the core covering and against the optical fiber for fixating the optical fiber in the longitudinal direction of the transmission element. The fixating element is further formed and positioned in such a way, that position changes of the optical fiber due to bending or elongation are possible. In this way, unallowable attenuation increases in the optical fiber due to bending or position changes can be avoided.

BACKGROUND OF INVENTION

The present invention concerns an optical transmission element with at least one optical fiber and with a core covering surrounding the optical fiber.

Optical transmission elements such as optical cables or optical cores are often installed in such a way, that the cable ends or core ends, respectively, hang down vertically at the connection points. This can lead to the optical fibers in the cable or core, respectively, which are usually positioned in the cable or core, respectively, with a defined excess length, partially emerging, due to the force of gravity. An emerging of the optical fibers poses a problem, especially in the area of connector sleeves, since the fibers being inserted into the connector sleeves bend sharply and can thus break because of emerging.

A usual method for fixating the optical fibers in an optical transmission element is filling the slot with high viscosity, thixotropic or cross-linked filling compound. Such a filling compound has the disadvantage, that it can run out or drip out in the case of vertically hanging ends of the transmission element. Additionally, contamination and problems with handling can occur when the filling compound leaks during opening up the transmission element during installation.

With dry, unfilled optical cables, swell tapes are often used for sealing the cable against water penetration. They are formed in such a way, that they swell during water penetration and thus seal the cable. Such a swelling tape usually does not fill the empty space between the optical fibers and the surrounding slot element so that the swell tape cannot fixate the fibers.

SUMMARY OF THE INVENTION

It is the objective of the present invention, to provide an optical transmission element with at least one optical fiber and a core covering surrounding the optical fiber, where the optical fiber is definitely fixated in the longitudinal direction of the transmission element and where unallowable attenuation increases in the optical fiber due to bending or changing lengths of the transmission element are avoided.

The objective is achieved by an optical transmission element according to the present invention.

The fixating of the optical fiber in the transmission element is achieved by a dry and compressible fixating element, which is positioned between the optical fiber and the core covering. It surrounds the optical fiber totally or partially and exerts a defined contact pressure against the core covering and the optical fiber, so that a certain fixating of the optical fiber along the longitudinal direction of the transmission is achieved. Since the fixating element is additionally formed and positioned in such a way, that position changes of the optical fibers due to bending or elongation are possible, unallowable attenuation increases in the optical fibers due to bending or position changes are avoided. Due to the fact, that changes in position to a certain degree are possible because of the compressible structure of the fixating element, the optical fiber, for example, in the form of one or more optical fibers, has a certain a certain empty space and ability to move, so that no unallowable attenuation increases occur, for example, during bending of the optical transmission element.

In an advantageous construction of the invention, the fixating element contains an elastic foam film or is formed as an elastic foam film. The foam preferably contains an elastomer foam, especially polyurethane foam, polyether foam or polyester foam. By means of the foam film, a defined setting of the contact pressure and the correct friction relative to the optical fiber is possible, where, however, certain position changes of the optical fiber are possible due to the flexible construction of the foam film.

In a further construction of the invention, the fixating element contains a fiber-like, fluffy material. Such a material has essentially similar characteristics as the foam film previously described. For example, cotton, fiber fill or velvet-like polyester with small density and high flexibility or good deformation, respectively, can be used. As the previously described foam film, such a fixating element also serves advantageously as crushing protection for the optical fiber.

In another construction of the invention, the fixating element is constructed in the form of a compressible sealing ring, which is wound around the optical fiber. The fixating element can also be constructed as a profile conforming to the cross-section form of the slot element and optical fiber. Profiles in the form of a U-profile or slit sealing rings are especially suited for this.

In an especially advantageous construction of the invention, several separate fixating elements are positioned along the longitudinal direction of the transmission element, with gaps in between, which are not occupied by fixating elements. In the gaps optical fibers can move comparatively easily during bending of the transmission element, so that attenuation increases can be prevented. For this, the gaps advantageously have a larger longitudinal extension than the respective fixating elements. Because of this, it is also possible, that several optical fibers, which are stranded together, can form an almost undisturbed excess length helix in the transmission element. In order for the fibers to be able to move easily within at least half a lay length during bending of the transmission element, the longitudinal extension of the respective gaps advantageously amounts to at least one lay length of the respective stranded optical fibers.

In one construction of the invention, several separate fixating elements are positioned along the longitudinal direction of the transmission element on a support film connecting the fixating elements. For creating a good waterproofing for the transmission element, the support film is formed with swelling ability on at least one side, for example, by providing it with a swell tape. In this way, very good waterproofing for the transmission element can be achieved, because the penetrating water is slowed down at each fixating element and thus it can spread along the longitudinal direction only very slowly. The free swellable side of the support film between the fixating elements can swell undisturbed in the slowly flowing water and quickly seals the empty space between the optical fibers and the core covering.

For this purpose, a support film with a swell medium dissolving from the ribbon can also be used, since the dissolving swell substance cannot be appreciatively washed away due to the severely slowed flow speed. In case of the swell substance being dissolved by the flowing water, it adheres again to the following fixating element. In this way, the transmission element is waterproofed after a few centimeters.

For further improvement of the waterproofing of the transmission element, the fixating element is mixed with a swellable medium or laminated with swell tape. For example, the swell substance is inserted in powder form into the gaps between the fixating elements, perhaps into the foam pores of the foam film or in the gaps in the fiber-like, fluffy material, respectively.

A further construction of the fixating element can be a foam film, which is laminated on one or both sides with a swell film. Swell tapes are preferably used for this, where the swell substance containing side is directed towards the foam film. Since the foam filling the empty space between the optical fiber and the transmission element severely breaks the penetrating water, the water can spread only very slowly along the transmission element. Thus the swell substance waterproofs the cable already after a few centimeters. It is also advantageous, that the swell substance in the foam or the fiber-like, fluffy material, respectively, adheres well and cannot be washed away.

BRIEF DESCRIPTION OF THE DRAWING FIGURES

FIGS. 1 to 3 depict respective cross-section views of constructions of an optical transmission element according to the invention.

FIG. 8 is a view in perspective of several foam films on a support film.

FIG. 9 is a view in perspective of an optical cable during manufacture.

DETAILED DESCRIPTION OF THE INVENTION

FIG. 1 shows an optical transmission element OE11 in the form of a cable, which contains several optical fibers LF11 in the form of single fibers. The single fibers LF11 are surrounded by a core covering AH11, where a fixating element FE11 in the form of a compressible foam film is positioned between the fibers LF11 and the core covering AH11. This foam film surrounds the individual fibers almost completely (by the application of the foam film around the fibers a slit SL is formed) and exerts a defined contact pressure against the core covering AH11 and the individual fibers LF11 and thus fixates the fibers in the longitudinal direction of the cable. Due to the flexible construction of the foam film, position changes of the fibers, for example, due to bending or elongation of the cable are made possible. The core covering AH11 is surrounded by a swell tape QV11, which in turn is surrounded by aramid yarns AG11. The cable is enclosed by the cable jacket KM11.

FIG. 2 shows a transmission element OE12, which shows optical fibers in the form of a fiber ribbon LFB12. A fixating element FE12 in the form of a foam film is positioned between the core covering AH12 and the fiber ribbons LFB12. It fulfills the same function as the foam film according to FIG. 1. The core covering AH12 is surrounded by aramid yarns AG12; tension-proof GFK elements ZE12 are embedded in the cable jacket KM12.

FIG. 3 shows a transmission element OE13, which shows an optical fiber LFB13 in the form of a 3×12 fiber bundle. A fixating element FE13 in the form of a foam film is positioned between a steel ribbon SB13 and the fiber bundle LFB13. Tension-proof steel wires ZE13 are embedded in the cable jacket KM13.

In all three examples according to FIG. 1 to 3, the fixating of the fibers in the cable is done by the respective elastic foam film, which surrounds the fibers. The cross-section of the film is measured in such a way, that the gap between the fibers and the slot surrounding the fibers is completely or nearly completely filled, so that a defined contact pressure on the fibers and core covering is created. The foam film preferably contains an elastomer foam with high friction value such as, for example, polyurethane foam, polyether foam of polyester foam. Preferably foam films with density of between 10 to 100 kg/m³ are used. The foam of the foam film preferably is formed with open pores.

Figure 4:
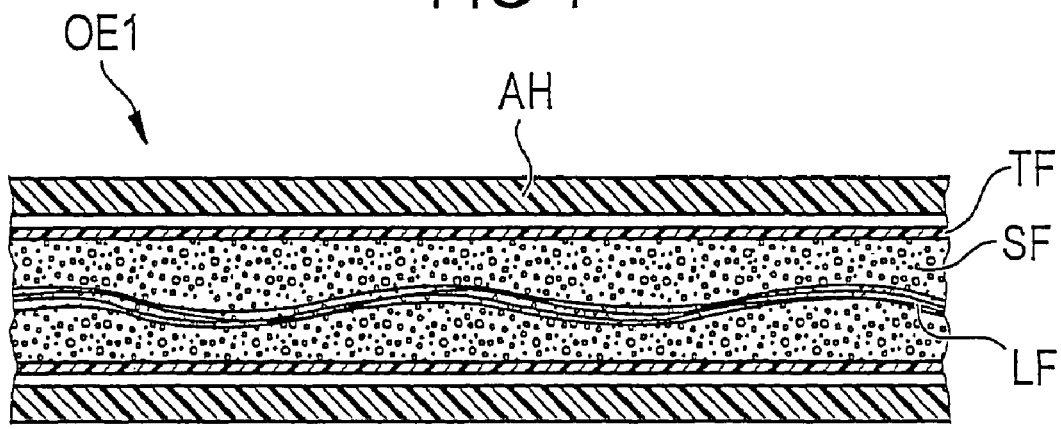
FIG. 4 is a longitudinal section of a construction of an optical core.

FIG. 4 shows a longitudinal section of a construction of an optical core OE1, where the optical fibers LF are stranded together and are disposed within the core covering AH with excess length. Between the optical fibers LF and the core covering AH, a continuous compressible foam film SF is positioned, which is fastened to a support film TF.

Figure 5:
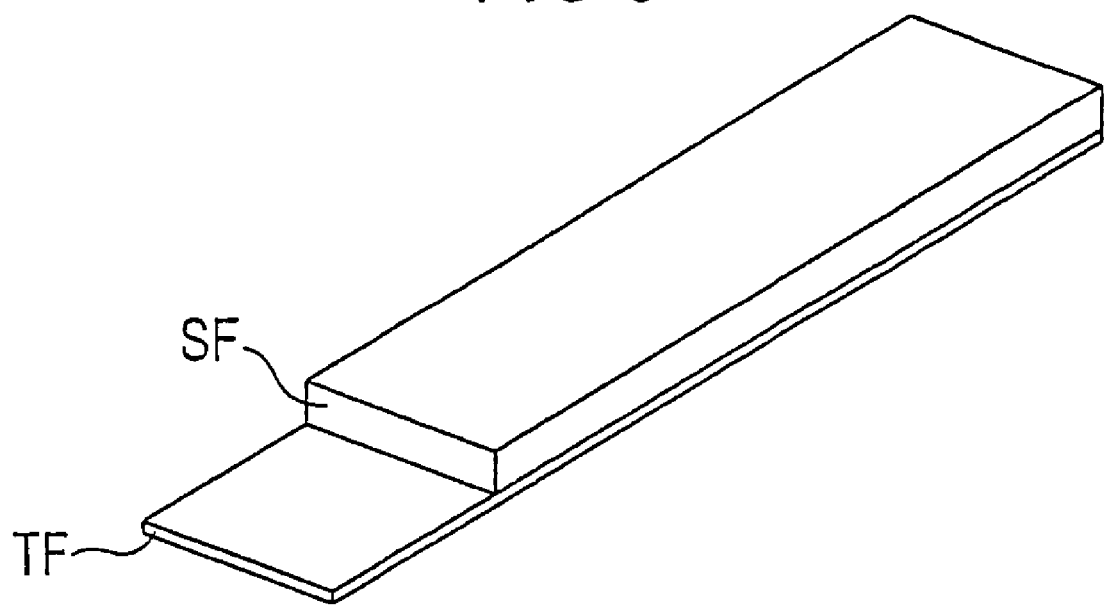
FIG. 5 is a view in perspective of a foam film with a support film.

FIG. 5 shows a view in perspective of a foam film SF (i.e., a longitudinal foam tape), which is positioned on a support film TF. The support film TF is preferably formed as a swell film (i.e., a longitudinal swell tape). In this way, good waterproofing of the optical transmission element can be achieved, since water penetrating is slowed down at the boundary of the foam film by its swelling.

Figure 6:
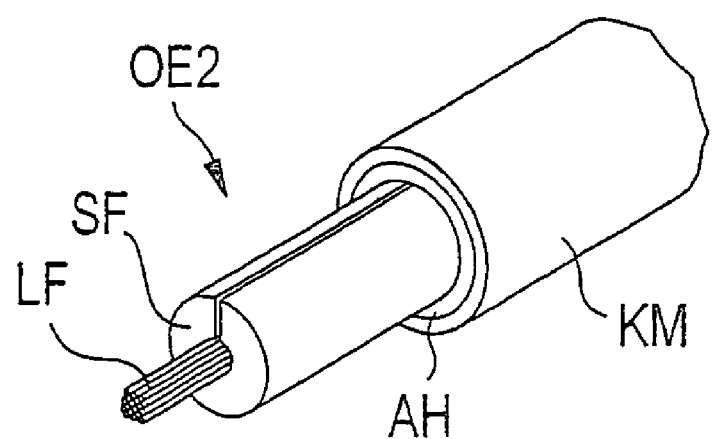
FIG. 6 is a view in perspective of an optical cable.

FIG. 6 shows a view in perspective of an optical cable OE2, which contains optical fibers LF surrounded by a foam film SF in a core covering AH, which is then surrounded by a cable jacket KM. The foam film SF is formed around the fibers LF as a tube and is then surrounded by the core covering AH or the cable jacket KM, respectively.

Figure 7:
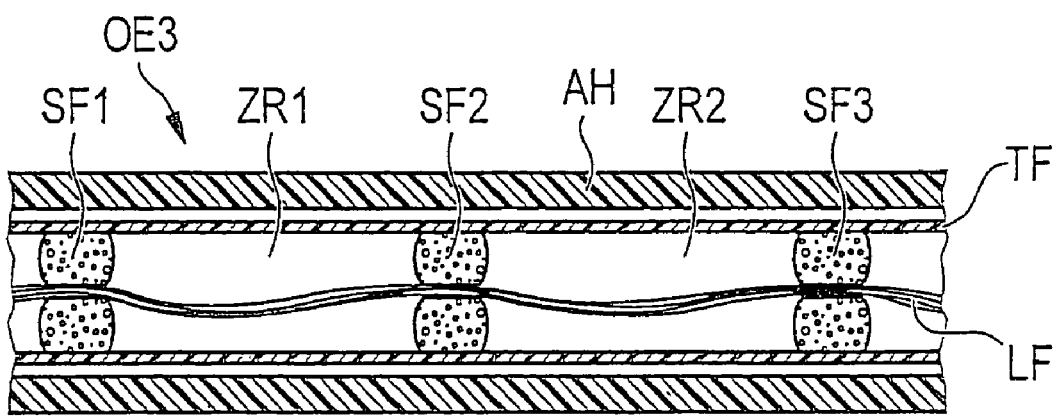
FIG. 7 is a longitudinal section of a further construction of an optical core.

FIG. 7 shows a longitudinal section of a further construction of an optical core OE3. Here several separate foam films SF1 to SF3 are positioned in the longitudinal direction of the transmission element, with gaps ZR1 and ZR2 positioned between them, which do not have applications of foam. The foam films SF1 to SF3 are arranged on a support film TF in the longitudinal direction of the transmission element. The optical fibers LF are stranded longitudinally and can form a nearly undisturbed excess length helix in the transmission element due to the gaps ZR1 and ZR2. The gaps ZR1 and ZR2 show a greater longitudinal extension than the respective foam films SF1 to SF3. It preferably amounts to more than half a lay length of the optical fibers. In this way, the optical fibers LF can easily move during bending of the transmission element OE3, whereby attenuation increases due to bending radii of the optical fibers, which are too small, can be prevented.

For the creation of good waterproofing, the support film TF is formed as a swell film. It is, for example, formed with swell capabilities on the side towards the foam segments. Penetrating water is strongly slowed down at each of the foam film segments and can therefore spread only very slowly in the longitudinal direction. The swell material positioned freely between the foam film segments can swell undisturbed in the slowly flowing water and quickly seals the empty space between the fibers LF and the core covering AH. In this connection, swell tapes with a swell substance dissolving from the tape can also be used, since the swell substance can only minimally be washed away due to the greatly diminished flow speed. Swell substance, which is washed away, can deposit itself on each of the foam film segments.

FIG. 8 shows a view in perspective of several foam film segments SF1, SF2 on a support film TF. The support film TF is able to swell at least on the side QA, preferably equipped with a swell tape. The swellable side QS of the support film TF is oriented toward the foam film segments SF1, SF2, which are arranged on it. The foam film segments are fastened to the support film TF in appropriate distances, for example, by means of gluing.

For especially good waterproofing, the foam films, which in their non-waterproof state fill the total empty space between the fibers and their protective covering, are displaced by a substance, that swells during water penetration. This swell substance can be positioned in the foam pores in powder form. In a further construction, the respective foam film can be laminated on both sides with a swell film. Preferably swell tapes are used for this purpose, whereby the swell substance containing side is oriented toward the foam material of the foam film. The swell substance is advantageously held firmly in the foam and cannot be washed away. The foam filling the gap strongly slows down penetrating water, so that it can spread along the transmission element only very slowly. The swell substance seals the transmission element already after a few centimeters.

FIG. 9 shows a view in perspective of an optical cable OE4 during manufacture. The foam film segments SF1 to SF3 located on the support film TF are formed into a tube around the fibers LF and are surrounded by a core covering AH and a cable jacket KM. The foam films SF1 to SF3 and also the foam film SF according to FIG. 6 are a prefabricated product and can be manufactured comparatively economically. The apparatus expenditure for the manufacture of the cable can therefore be kept comparatively low.

Figure 10:
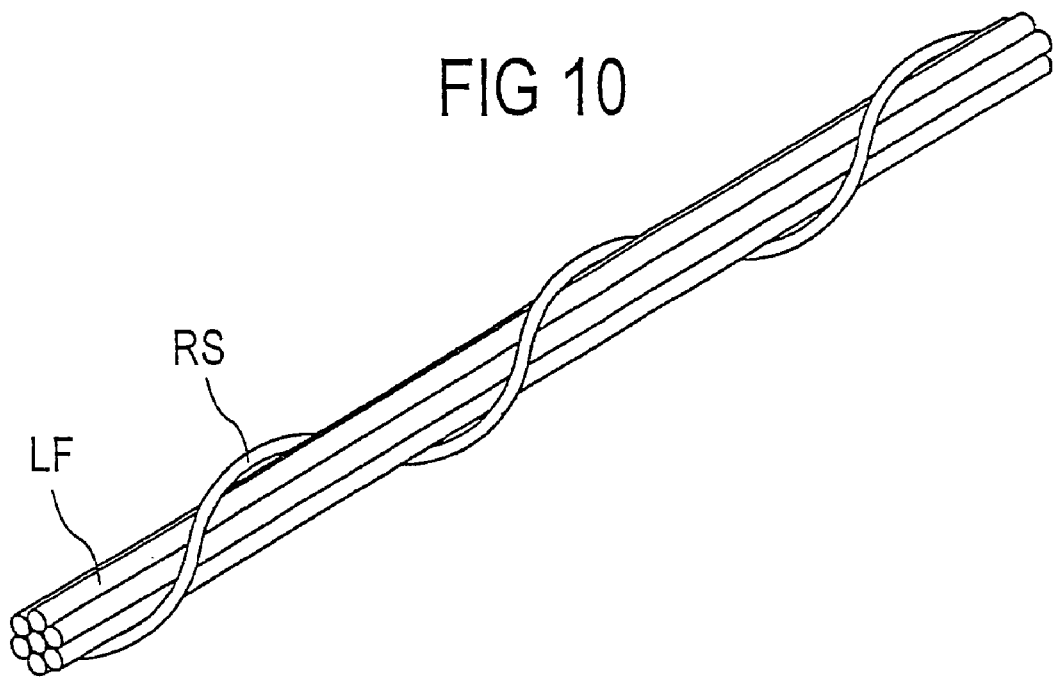
FIGS. 10 and 11 are respective views in perspective of further constructions of an optical transmission element according to the invention.

FIG. 10 is a view in perspective of a construction of an optical transmission element, where the optical fibers LF are wound by a fixating element in the form of a compressible sealing ring RS. The sealing ring RS supports itself by leaning toward the outside against a core covering, which is not depicted.

Figure 11:
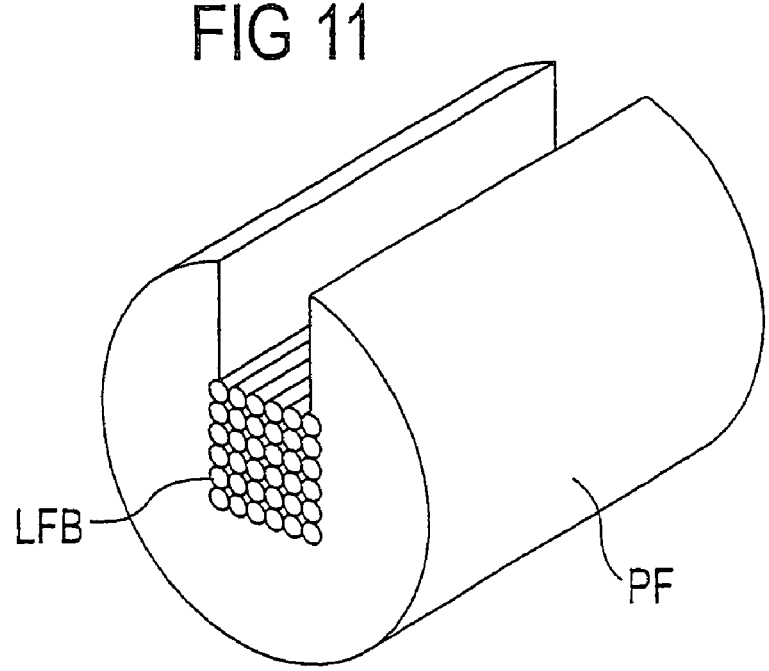

FIG. 11 shows a further construction of a transmission element, where the fixating element is formed as a profile PF, which conforms to the respective cross-section form of a core covering not depicted and the optical fiber LFB. The profile PF has the form of a U-profile.

The invention claimed is:

1. An optical transmission element, comprising:
   at least one optical fiber;
   a core covering, the core covering being a metal tube disposed about the at least one optical fiber, wherein a space is defined by an area disposed between the at least one optical fiber and the core covering at a cross-section of the optical transmission element; and
   at least one fixating element, the at least one fixating element including a foam tape, the foam tape being disposed between the at least one optical fiber and the core covering, wherein the at least one fixating element extends longitudinally along the core covering and the at least one fixating element substantially fills the space between the at least one optical fiber and the core covering at one or more cross-sectional portions of the optical transmission element for coupling the at least one optical fiber while allowing for position changes of the at least one optical fiber during bending or elongation of the optical transmission element.

2. The optical transmission element according to claim 1, wherein the at least one fixating element further includes a swell tape.

3. The optical transmission element according to claim 1, wherein the foam tape is selected from the group consisting of an elastomer foam, a polyurethane foam, a polyether foam, and a polyester foam.

4. The optical transmission element according to claim 1, wherein the foam tape has a density between about 10 kg/m$^3$ and about 100 kg/m$^3$.

5. The optical transmission element according to claim 1, wherein the foam tape has open pores.

6. The optical transmission element according to claim 1, wherein the at least one optical fiber is a portion of an optical fiber ribbon and the at least one fixating element contacts a portion of the optical fiber ribbon.

7. The optical transmission element according to claim 1, wherein the at least one fixating element further includes a swellable portion for inhibiting the migration of water along the optical transmission element.

8. The optical transmission element according to claim 1, wherein the optical transmission element is a portion of a fiber optic cable, the fiber optic cable having at least one strength element.

9. An optical transmission element, comprising:
   at least one optical fiber;
   a core covering, the core covering being a metal tube disposed about the at least one optical fiber; and
   at least one fixating element, the at least one fixating element includes a foam tape that is attached to a swell tape, the at least one fixating element being disposed between the at least one optical fiber and the core covering, wherein the at least one fixating element extends longitudinally along the core covering for coupling the at least one optical fiber while allowing for position changes of the at least one optical fiber during bending or elongation of the optical transmission element.

10. The optical transmission element of claim 9, wherein the at least one fixating element substantially fills a space defined by an area disposed between the at least one optical fiber and the core covering at one or more cross-sectional portions of the optical transmission element.

11. The optical transmission element according to claim 9, wherein the swell tape has a swell substance and a swell substance side of the swell tape is oriented toward the foam tape.

12. The optical transmission element according to claim 9, wherein the foam tape is selected from the group consisting of an elastomer foam, a polyurethane foam, a polyether foam, and a polyester foam.

13. The optical transmission element according to claim 9, wherein the foam tape has a density between about 10 kg/m$^3$ and about 100 kg/m$^3$.

14. The optical transmission element according to claim 9, wherein the foam tape has open pores.

15. The optical transmission element according to claim 9, wherein the at least one optical fiber is a portion of an optical fiber ribbon and the at least one fixating element contacts a portion of the optical fiber ribbon.

16. The optical transmission element according to claim 9, wherein the optical transmission element is a portion of a fiber optic cable, the fiber optic cable having at least one strength element.

17. An optical transmission element, comprising:
a plurality of optical fiber ribbons, the optical fiber ribbons forming a ribbon stack;
a core covering, the core covering being a metal tube disposed about the ribbon stack, wherein a space is defined by an area disposed between the ribbon stack and the core covering at a cross-section; and
at least one fixating element, the at least one fixating element includes a foam tape, the at least one fixating element being disposed between the ribbon stack and the core covering and the at least one fixating element substantially fills the space between the ribbon stack and the core covering at one or more cross-sectional portions of the optical transmission element, wherein the at least one fixating element extends longitudinally along the core covering for coupling the plurality of optical fiber ribbons while allowing for position changes of the plurality of optical fiber ribbons during bending or elongation of the optical transmission element.

18. The optical transmission element according to claim 17, wherein the at least one fixating element includes a swell feature for inhibiting the migration of water along the optical transmission element.

19. The optical transmission element according to claim 17, wherein the at least one fixating element further includes a swell tape, and the swell tape has a swell substance and a swell substance side of the swell tape is oriented toward the foam tape.

20. The optical transmission element according to claim 17, wherein the foam tape is selected from the group consisting of an elastomer foam, a polyurethane foam, a polyether foam, and a polyester foam.

21. The optical transmission element according to claim 17, wherein the foam tape has a density between about 10 $kg/m^3$ and about 100 $kg/m^3$.

22. The optical transmission element according to claim 17, wherein the foam tape has open pores.

23. The optical transmission element according to claim 17, wherein the at least one fixating element contacts a portion of the ribbon stack.

24. The optical transmission element according to claim 17, wherein the optical transmission element is a portion of a fiber optic cable, the fiber optic cable having at least one strength element.

* * * * *